United States Patent
Monti et al.

(10) Patent No.: US 10,961,883 B2
(45) Date of Patent: Mar. 30, 2021

(54) INTERNAL COMBUSTION ENGINE PROVIDED WITH A SYSTEM SUPPLYING A WATER-BASED OPERATOR LIQUID

(71) Applicant: MARELLI EUROPE S.p.A., Corbetta (IT)

(72) Inventors: Federico Monti, Bologna (IT); Giovanni Bonandrini, Bologna (IT); Antonio Barbuto, Bologna (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/665,871

(22) Filed: Oct. 28, 2019

(65) Prior Publication Data
US 2020/0132022 A1    Apr. 30, 2020

(30) Foreign Application Priority Data
Oct. 29, 2018  (IT) .......................... 102018000009870

(51) Int. Cl.
*F02M 25/03* (2006.01)
*F01N 3/00* (2006.01)
(Continued)

(52) U.S. Cl.
CPC ........... *F01N 3/005* (2013.01); *F01N 3/0205* (2013.01); *F02M 25/0222* (2013.01);
(Continued)

(58) Field of Classification Search
CPC ...... F01N 3/005; F01N 3/0205; F01N 3/0234; F01N 3/2889; F01N 2240/02;
(Continued)

(56) References Cited

U.S. PATENT DOCUMENTS

2011/0083621 A1*  4/2011  Ogunleye ............... F01N 3/208
                                                                 123/41.02
2011/0168128 A1*  7/2011  Bradley .................. F01N 3/005
                                                                 123/294
(Continued)

FOREIGN PATENT DOCUMENTS

| EP | 3214281    | * | 9/2017 | ............. F01N 3/005 |
| WO | 2010092684 | A1 | 8/2010 | |
| WO | 2016150599 | A1 | 9/2016 | |

OTHER PUBLICATIONS

Machine translation of EP-3214281-A1, accessed Sep. 13, 2020. (Year: 2020).*

(Continued)

*Primary Examiner* — Jonathan R Matthias
(74) *Attorney, Agent, or Firm* — Howard & Howard Attorneys PLLC

(57) ABSTRACT

Internal combustion engine having: a cylinder defining a combustion chamber; an exhaust duct that is flown through by the exhaust gases; and a system to supply a water-based operator liquid to the combustion chamber having: a tank designed to contain a certain amount of water-based operator liquid and a heating device designed to heat the water-based operator liquid contained in the tank. The heating device has: a first gas-liquid heat exchanger, which is designed to be flown through by at least part of the exhaust gases flowing along the exhaust duct; a second liquid-liquid heat exchanger, which is designed to heat the water-based operator liquid contained in the tank; and a hydraulic circuit, which is designed to send round an exchange fluid through the first heat exchanger to transfer the heat from the exhaust gases to the exchange fluid and through the second heat exchanger to transfer the heat from the exchange fluid to the water-based operator liquid contained in the tank.

15 Claims, 3 Drawing Sheets

(51) Int. Cl.
*F01N 3/02* (2006.01)
*F02M 25/022* (2006.01)
(52) U.S. Cl.
CPC ........ *F02M 25/0224* (2013.01); *F02M 25/03* (2013.01); *F02M 25/0227* (2013.01)
(58) Field of Classification Search
CPC ....................... F01N 2610/105; F02M 25/028; F02M 25/03; F02M 25/0222; F02M 25/0224
See application file for complete search history.

(56) References Cited

U.S. PATENT DOCUMENTS

| | | | |
|---|---|---|---|
| 2014/0116404 A1* | 5/2014 | Piper | F02M 25/0222 123/568.12 |
| 2018/0274488 A1 | 9/2018 | Martin et al. | |
| 2019/0017422 A1* | 1/2019 | Bradford | F01N 3/02 |

OTHER PUBLICATIONS

Search Report for Italian Application No. 201800009870 dated Mar. 29, 2019.

* cited by examiner

INTERNAL COMBUSTION ENGINE PROVIDED WITH A SYSTEM SUPPLYING A WATER-BASED OPERATOR LIQUID

CROSS-REFERENCE TO RELATED APPLICATIONS

This patent application claims priority from Italian patent application no. 102018000009870 filed on Oct. 29, 2018, the entire disclosure of which is incorporated herein by reference.

TECHNICAL FIELD

The present invention relates to an internal combustion engine provided with a system supplying a water-based operator liquid.

The present invention finds advantageous application to an internal combustion engine equipped with a system supplying water that is injected into the combustion rooms, to which the following discussion will make explicit reference without losing its general character.

PRIOR ART

As already known, in an internal combustion engine it has been proposed to supply water, besides the fuel, to the combustion chambers defined within the cylinders.

In an internal combustion engine, the water injection system consists in introducing water into the engine through the intake duct, in the form of a spray, or mixed with the fuel, or directly in the combustion chamber, in order to cool the air/fuel mixture and increase the resistance to detonation phenomena. Water has a high latent vaporization heat, in other words it requires a lot of energy to pass from the liquid to the gaseous state. When room temperature water is injected into the intake duct, it absorbs heat from the incoming air and from the metal walls, evaporating and then cooling the incoming charge. Therefore, the engine draws in fresher air, in other words denser air, the volumetric efficiency is improved and the possibility of detonation is reduced. Moreover, it is possible to inject more fuel. During compression, the water present in tiny drops evaporates and absorbs heat from the compressing air, cooling it and lowering the pressure. Compression is followed by combustion, which has a further beneficial effect. Combustion develops a lot of heat, which is absorbed by the water, thus reducing the cycle peak temperature and consequently reducing the formation of NOx and the heat that the engine walls must absorb. This evaporation also converts part of the engine heat (which would otherwise have been wasted) into pressure, given precisely by the formed steam, increasing the thrust on the piston and further increasing at the exhaust the flow of energy entering any turbine. Moreover, the turbine would benefit from the reduction in the temperature of the exhaust gases due to the heat absorption performed by the additional water.

The water supply system includes a tank that is filled with demineralized water to avoid any scale formation. Normally, the tank is replenished from the outside of the vehicle or it could also be replenished using the condensation of the air conditioner, taking advantage of the condensation from the exhaust or even conveying rainwater. Moreover, the tank is generally provided with an electric heating device (i.e. it is provided with a resistance that generates heat due to the Joule effect when it is flown through by an electric current), which is used to melt any ice when the external temperature is particularly rigid.

The patent application US 2014116404A1 discloses an internal combustion engine comprising: a plurality of cylinders defining respective combustion chambers; an exhaust duct that is flown through by the exhaust gases coming from the combustion chambers; and a water injection system to the combustion chambers. The injection system comprises a tank designed to contain an amount of water (condensed from the recirculated exhaust gases) and a heating device that is coupled to the tank, is designed to heat the water contained in the tank and uses as heat source an electric resistance or the cooling liquid of the internal combustion engine.

The patent application WO 2010092684A1 discloses an internal combustion engine in which the fuel that is injected into the combustion chambers is hydrogen (contained in a first tank) and in which the comburent that is supplied into the combustion chambers is pure oxygen (contained in a second tank) to which argon is added, said argon being recycled from the exhaust. In particular, in the exhaust duct a separation between argon and water occurs, said water being condensed and collected in a third tank and then dispersed in the environment after having been used to cool the exhaust gases.

DESCRIPTION OF THE INVENTION

The object of the present invention is to provide an internal combustion engine provided with a supply system of a water-based operator liquid, wherein said internal combustion engine has a high-energy efficiency and, at the same time, is easy and inexpensive to manufacture.

According to the present invention, an internal combustion engine is provided with a system supplying a water-based operator liquid, according to what stated in the attached claims.

The claims describe embodiments of the present invention forming an integral part of the present description.

BRIEF DESCRIPTION OF THE DRAWINGS

The present invention will now be described with reference to the annexed drawings showing a non-limiting embodiment, in which.

PREFERRED EMBODIMENTS OF THE INVENTION

Figure 1:
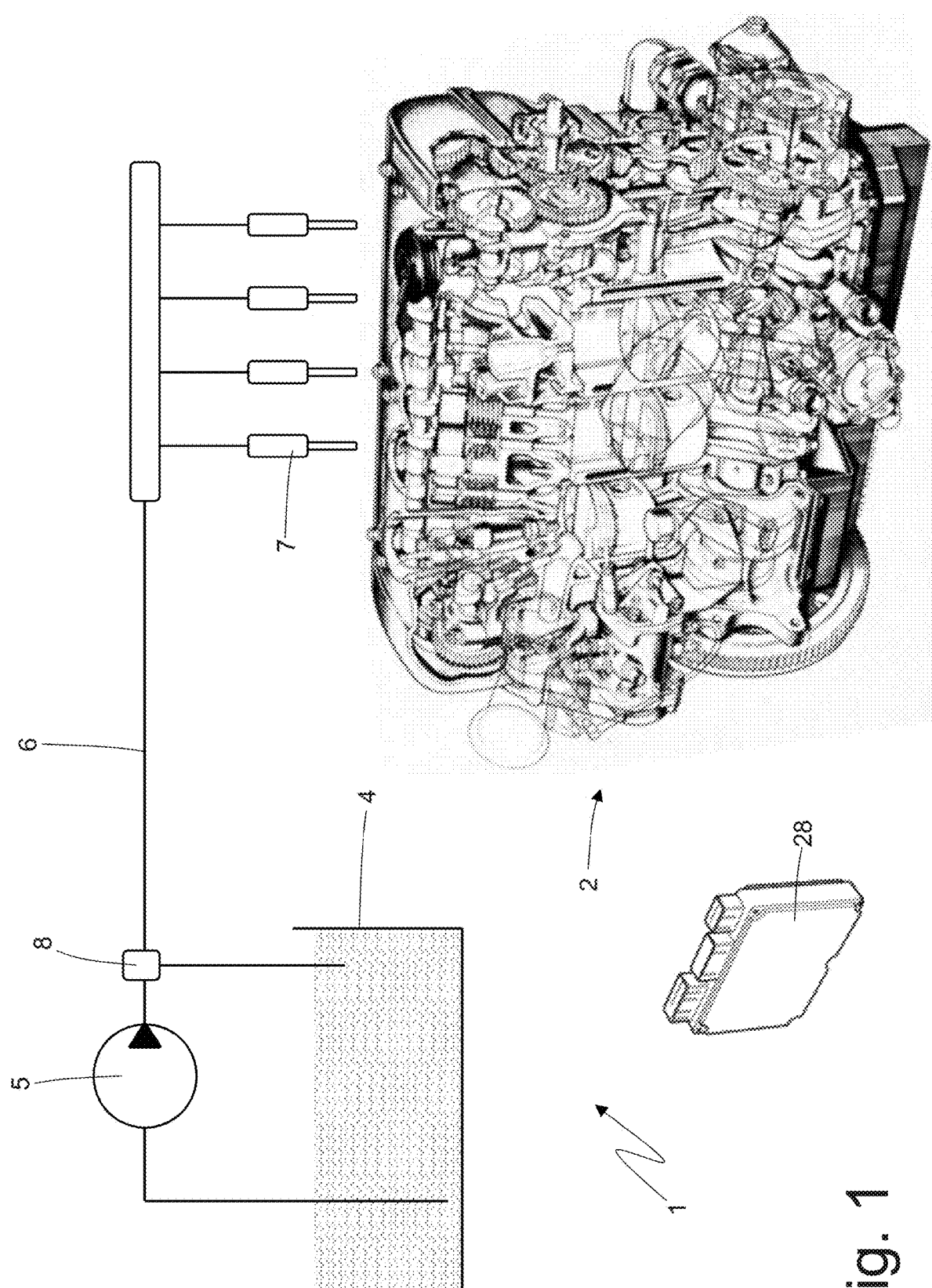
FIG. 1 is a schematic view of an internal combustion engine provided with a water supply system for at least one combustion chamber.

In FIG. 1, the number 1 indicates as a whole a water supply system in an internal combustion engine 2; the water is destined to the combustion chambers formed in the cylinders of the internal combustion engine 2 to increase the combustion efficiency and/or the generated power. Following the combustion, exhaust gases are generated in the combustion chamber of each cylinder. These gases are conveyed through an exhaust duct 3 (partially and schematically shown in FIG. 2) to be then introduced into the external environment after an adequate treatment (e.g. in a catalyst).

The supply system 1 comprises a tank 4 containing a mass of water and a pump 5, which draws water inside the tank 4 and sends the pressurized water to a supply duct 6. A plurality of injectors 7 are connected to an end portion of the supply duct 6 and inject the water at low pressure into corresponding intake ducts through which the fresh air is conveyed towards the cylinders. According to another embodiment, the injectors 7 could inject the pressurized water directly inside the cylinders (in this case, a further high-pressure pump is generally provided). According to a further embodiment, the water supplied by the supply system 1 is mixed with the fuel injected into the cylinders.

Along the supply duct 6 and immediately downstream of the pump 5 there is a maximum pressure valve 8, namely a valve that opens re-introducing the excess water into the tank 4 when the pressure inside the supply duct 6 exceeds a predetermined threshold value. This means that the maximum pressure valve 8 acts as a pressure regulator to prevent the pressure inside the supply duct 6 from exceeding the predetermined threshold value.

According to an alternative and perfectly equivalent embodiment, a pressure sensor is provided downstream of the pump 5 (e.g. in a common channel to which the injectors 7 are connected) and the flow rate of the pump 5 is feedback adjusted to maintain the pressure downstream of the pump 5 about a desired value, which can also vary depending on the engine point. In this embodiment, the maximum pressure valve 8 is absent or is present only for safety reasons (i.e. it intervenes only in the event of errors in the control or in the event of malfunctions).

Figure 2:
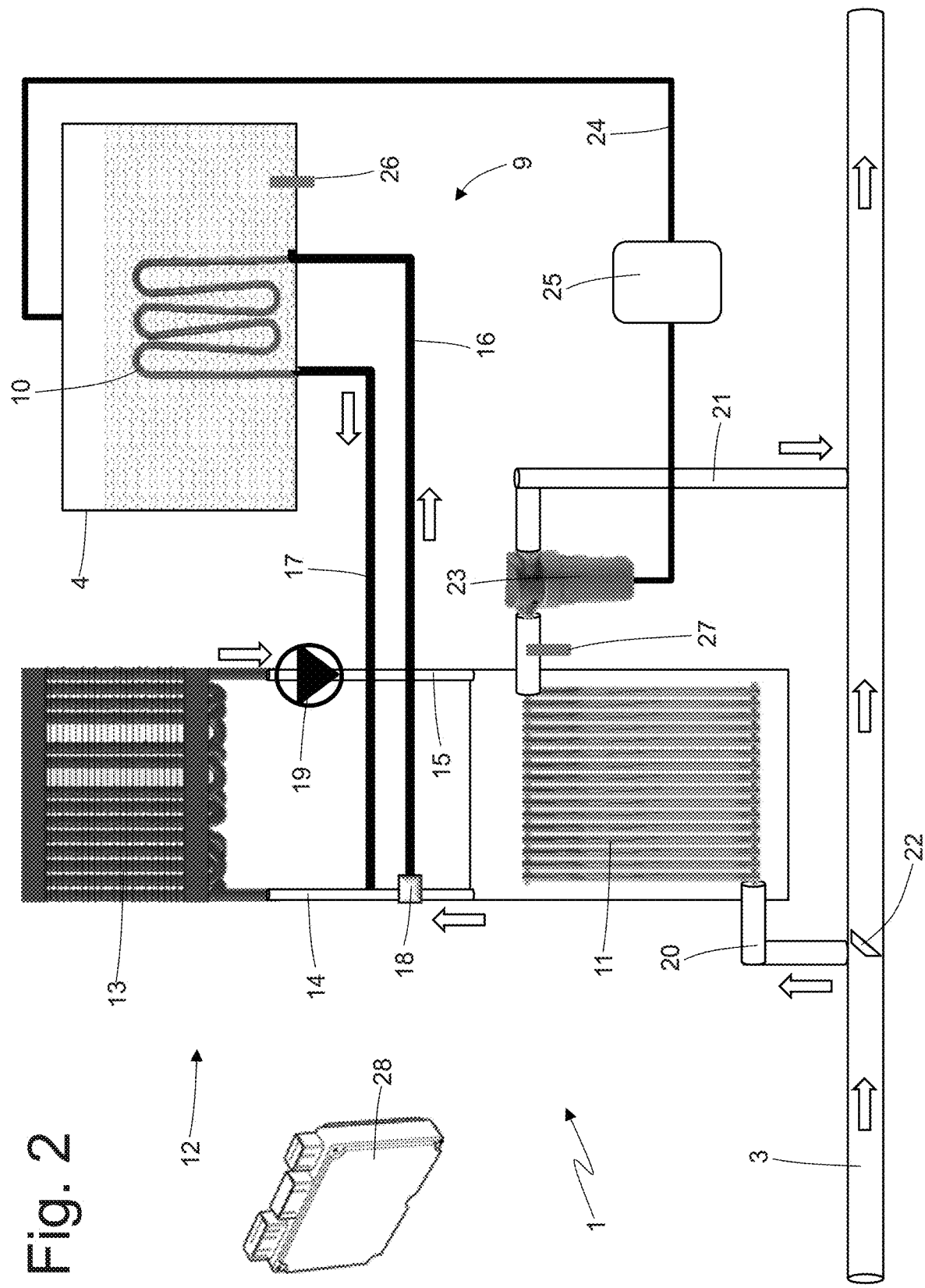
FIG. 2 schematically shows the water supply system of FIG. 1.

As shown in FIG. 2, the supply system 1 comprises a heating device 9, which is coupled to the tank 4 and is designed to heat the water contained in the tank 4. In particular, the heating device 9 comprises a liquid-liquid heat exchanger 10, which transfers (according to the methods described below) part of the heat of the exhaust gas generated by the internal combustion engine 2 to the water contained in the tank. Besides the heat exchanger 10, the heating device 9 could also comprise an electrical resistance (i.e. an element that transforms electric energy into heat by means of the Joule effect).

As shown in FIG. 2, the heating device 9 comprises a gas-liquid heat exchanger 11, which is designed to be flown through by at least part of the exhaust gases that flow along the exhaust duct 3. Moreover, the heating device 9 comprises a hydraulic circuit 12, which is designed to send round an exchange fluid (e.g. water added with anti-freeze and anti-corrosion additives) through the heat exchanger 11 to transfer the heat from the exhaust gases to the exchange fluid and through the heat exchanger 10 to transfer the heat from the exchange fluid to the water contained in the tank 4. It should be noted that the exchange fluid flowing (located) in the hydraulic circuit 12 is completely independent and separate both from the water flowing (located) in the supply system 1 and from the exhaust gases flowing (located) in the exhaust duct 3. In fact, as clearly shown in FIG. 2, the hydraulic circuit 12 is fluidically (i.e. hydraulically and pneumatically) isolated both from the supply system 1 and from the exhaust duct 3.

It is further provided a liquid-gas heat exchanger 13, which is part of the hydraulic circuit 12 and is flown through by the exchange fluid to transfer the heat from the exchange fluid to the external environment. This means that the heat exchanger 13 is a radiator whose function is cooling the exchange fluid by transferring heat to the external environment.

The hydraulic circuit 12 comprises a delivery duct 14, connecting a (liquid) outlet of the heat exchanger 11 to a (liquid) inlet of the heat exchanger 13, and a return duct 15 connecting a (liquid) outlet of the heat exchanger 13 to a (liquid) inlet of the heat exchanger 11. This means that the warmer exchange fluid (because it has been heated in the heat exchanger 11) flows from the heat exchanger 11 to the heat exchanger 13 through the delivery duct 14, whereas the colder exchange fluid (because it has been cooled in the heat exchanger 13) flows from the heat exchanger 13 to the heat exchanger 11 through the return duct 15.

Moreover, the hydraulic circuit 12 comprises a delivery duct 16 connecting the delivery duct 14 to an inlet of the heat exchanger 10, and a return duct 17 connecting an outlet of the heat exchanger 10 to the delivery duct 14 (obviously downstream of the delivery duct 16). In other words, the delivery duct 16 takes a part of the warmer exchange fluid (because it has been heated in the heat exchanger 11) from the delivery duct 14 to send round the exchange fluid through the heat exchanger 10. Then, the exchange fluid leaving the heat exchanger 10 is returned to the delivery duct 14 (obviously downstream of the delivery duct 16) from the return duct 17.

The hydraulic circuit 12 comprises an adjusting solenoid valve 18, which is designed to regulate the flow rate of the exchange fluid flowing through the heat exchanger 10. In particular, the adjusting solenoid valve 18 is arranged along the delivery duct 16 (e.g. at the beginning of the delivery duct 16, namely at the branching of the delivery duct 16 from the delivery duct 14) to regulate the flow rate of the exchange fluid that is diverted from the delivery duct 14 to the delivery duct 16.

The hydraulic circuit 12 comprises a circulation pump 19 (driven by an electric motor) providing to the circulation of the exchange fluid along the hydraulic circuit 12. In the embodiment shown in the attached figures, the circulation pump 19 is arranged along the return duct 15, whereas according to other embodiments not shown, the circulation pump 19 has a different positioning, e.g. along the delivery duct 14.

It is provided an intake duct 20, which connects the exhaust duct 3 to a (gas) inlet of the heat exchanger 11, and a return duct 21, which connects a (gas) outlet of the heat exchanger 11 to the exhaust duct 3, obviously downstream of the intake duct 20. By way of example, the intake duct 20 originates from the exhaust duct 3 immediately downstream of a catalyst. The intake duct 20 is coupled with an adjustment solenoid valve 22, which is designed to regulate the flow rate of the exhaust gas entering the intake duct 20 from the exhaust duct 3. In the embodiment shown in the attached figures, the adjusting solenoid valve 22 is arranged in the exhaust duct 3 at the beginning of the intake duct 20, whereas according to other embodiments not shown the adjusting solenoid valve 22 has a different positioning (e.g. inside the intake duct 20 and more or less close to the exhaust duct 3). A condensate separator 23 is arranged along the return duct 21 and close to the heat exchanger 11, said separator being designed to separate the condensed water present in the exhaust gases, namely the condensate forming in the exhaust gases after the exhaust gases cooling occurring inside the heat exchanger 11. For example, the condensate separator 23 could be of the cyclonic or centrifugal type. It is provided a supply duct 24 that connects the condensate separator 23 to the tank 4 to feed the condensed water separated from the condensate separator 23 into the tank 4.

According to a preferred embodiment, a treatment device 25 designed to subject the condensed water to a purification treatment is provided along the supply duct 24. For example, the treatment device 25 could comprise a mechanical filter that blocks solid particles (i.e. those having too large a size, i.e. a size larger than a width of the filter meshes) and could further comprise a chemical filter (e.g. with activated carbon) that holds back ions (especially calcium and magnesium) present in the condensed water. Inside the tank 4 it is provided a temperature sensor 26 that is designed to measure a temperature of the water contained in the tank 4. Along the return duct 21 and between the exchanger 11 and the condensate separator 23 it is provided a temperature sensor 27 designed to measure a temperature of the exhaust gases leaving the heat exchanger 11 and entering the condensate separator 23. It is provided a control unit 28 that is connected to the two temperature sensors 26 and 27 and controls the adjusting solenoid valves 18 and 22 and the electric motor of the circulation pump 19.

In use, the control unit 28 adjusts a degree of opening of the adjusting solenoid valve 18 based on the temperature measured by the temperature sensor 26, both to avoid the formation of ice or to melt any ice present in the tank 4 and to subject the water contained in the tank 4 to a heat treatment to prevent the proliferation of microorganisms (as will be better described later). Generally, the control unit 28 always tries to heat the water contained in the tank 4 by exploiting the heat possessed by the exhaust gases (this heat is "free", as it is available and is in any case dispersed in the environment) and avoiding heating the water contained in the tank 4 to temperatures above 60-75° C. (so as not to damage the components of the tank 4, which are generally made of plastic material). In other words, in use the control unit 28 performs a feedback control, which acts on the degree of opening of the adjusting solenoid valve 18 based on the difference between a desired temperature of the water contained in the tank 4 and an actual temperature (measured by the temperature sensor 26) of the water contained in the tank 4.

In use, the control unit 28 adjusts a degree of opening of the adjusting solenoid valve 22 based on the temperature measured by the temperature sensor 27 both to optimize the condensation of the water in the exhaust gases (generally, the condensation is high when the exhaust gas outlet temperature is lower than 45-55° C.) and to avoid any damage to the condensate separator 23 (generally, the condensate separator 23 is not able to withstand temperatures higher than 65-75° C.). In other words, in use the control unit 28 performs a feedback control acting on the degree of opening of the adjusting solenoid valve 22 based on the difference between a desired temperature of the exhaust gases leaving the heat exchanger 11 and an actual temperature (measured by the temperature sensor 27) of the exhaust gases leaving the heat exchanger 11.

The water contained in the tank 4 could contain microorganisms (e.g. bacteria, spores . . . ) or living organisms whose size is such that they cannot be seen with the naked eye (less than 0.1 mm). Such microorganisms can proliferate inside the tank 4 over time, generating colonies that can, for example, (partially or completely) obstruct the water inlet of the pump 5 or that can be sucked by the pump 5 and then sent towards the injectors 7 with the risk of clogging the pump 5, any filters arranged downstream of the pump 5, the injectors 7 or, if they reach the combustion chambers formed in the cylinders of the internal combustion engine 2, jeopardizing the combustion with a potential degradation of the performance and/or a potential increase in the generation of pollutants. In other words, the microorganisms present in the water contained in the tank 4 can proliferate and increase in number over time, leading, for example, to the formation of algae or biofilms on the walls of the tank 4. Such algae or biofilms, detaching from the walls, can obstruct the inlet of the pump 5 or can even be sucked by the pump 5 and thus reach the injectors 7 and/or the combustion chambers formed in the cylinders.

According to a preferred embodiment, the tank 4 has as its only inlet the supply duct 24 and therefore receives water only and solely from the supply duct 24. In other words, the only way to fill the tank 4 with water is to use the condensed water from the condensate separator 23. In this way, the tank 4 is (should be) a closed system immune to external contamination, i.e. it cannot receive water that contains microorganisms that could proliferate inside the tank 4 causing the formation of harmful impurities. In this regard it should be noted that the water coming from the combustion chambers has been subjected to very high temperatures (close if not higher than 1000° C.) and also to very high pressures and is therefore completely devoid of living microorganisms.

Obviously, it is always possible that the water contained in the tank 4 is contaminated by microorganisms entering the tank 4 or the other elements hydraulically connected to the tank 4 during the assembly or maintenance of the supply system 1. Consequently, the control unit 28 also drives the heating device 9 to heat the water contained in the tank 4 to a temperature higher than 60° C. (preferably 70° C.) in order to obtain a heat treatment (i.e. a sort of sterilization/pasteurization) of the water contained in the tank 4, or in order to obtain a reduction in the concentration of microorganisms present in the water 3 contained in the tank 4 thanks to the heat. It should be noted that the heat treatment that is carried out using the heating device 9 is a kind of sterilization (namely a partial, incomplete sterilization) since, considering that it cannot reach very high temperatures (above 100° C.) to avoid damaging the tank 4 or the components housed in the tank 4, at the end of the heat treatment the water contained in the tank 4 is not "sterile" in the medical sense, but has significantly reduced the presence of microorganisms.

In other words, the control unit 28 uses (each time the internal combustion engine 2 is turned on) the heating device 9 (initially provided only in an anti-ice function) to subject the water contained in the tank 4 to a heat treatment aimed at reducing (as far as possible) microorganisms in vegetative form, germs and, with a prolonged action, even some bacterial spores.

Experimental tests have shown that heating the water contained in the tank 4 at 70° C.-75° C. for at least 2-5 minutes gives a reduction of 90-98% of the total bacterial concentration.

A possible embodiment provides at least one silver-containing body that is arranged in the tank 4 in contact with the water and has antibacterial properties. In other words, silver has natural bacteriostatic properties that keep the bacterial concentration of the water in the tank 4 under control, thus avoiding the proliferation of algae and biofilms over time. The function of the silver-containing body is to limit the proliferation of microorganisms when the vehicle remains parked (turned off) for a long time (so that therefore the water contained in the tank 4 is not heated), for example between the production and the sale of the vehicle.

According to a possible embodiment, the hydraulic circuit 12 is exclusively dedicated to the heating device 9, i.e. the hydraulic circuit 12 is used only by the heating device 9.

Figure 3:
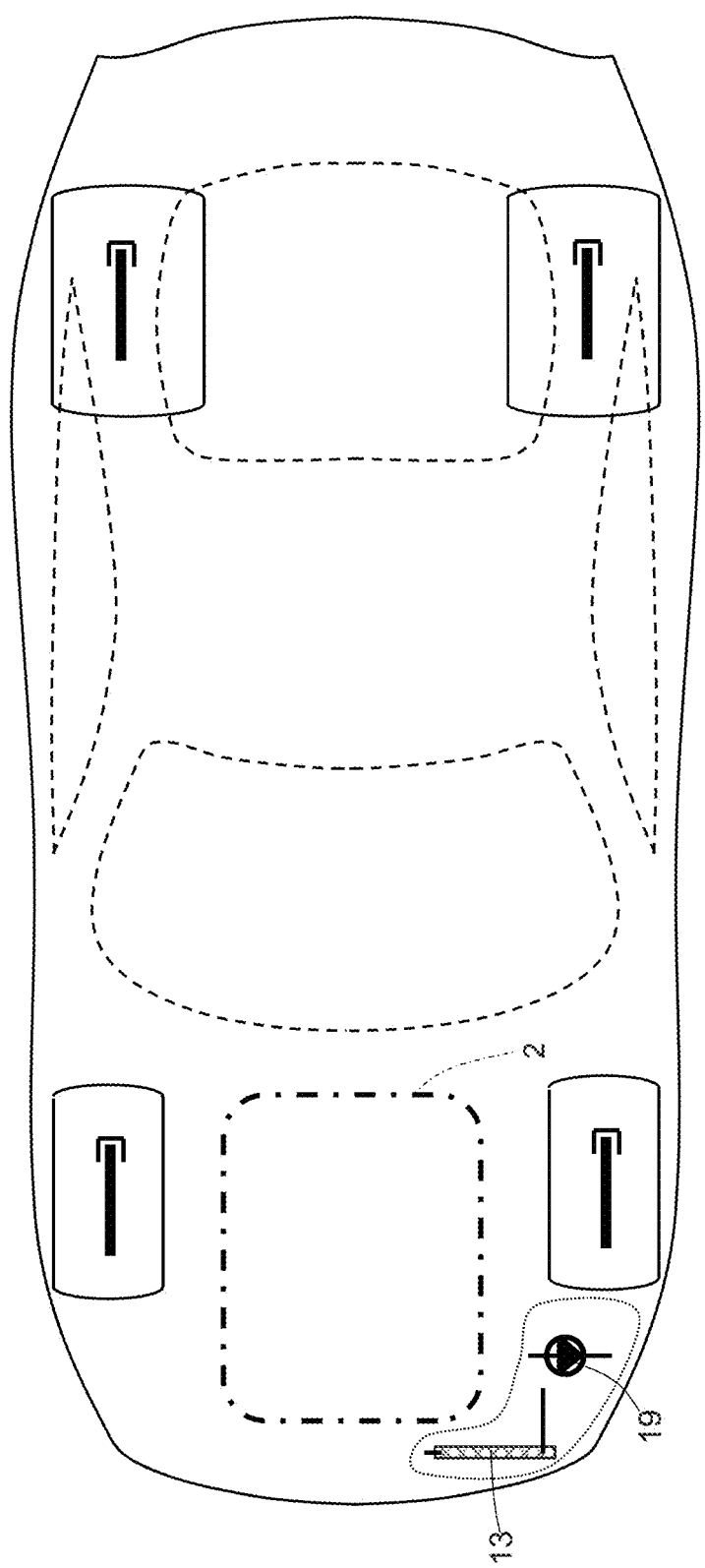
FIG. 3 is a schematic view of a road vehicle in which the internal combustion engine of FIG. 1 is mounted.

According to an alternative embodiment, the hydraulic circuit 12 is partially shared with an air conditioning system (schematically shown with a dashed line in FIG. 3) of a vehicle (schematically shown in FIG. 3) in which the internal combustion thermal motor 2 is mounted; in particular, the liquid-gas heat exchanger 13 (i.e. the radiator) and/or the circulation pump 19 are both parts of the hydraulic circuit 12 of the heating device 9 and of a hydraulic circuit of a cooling device (i.e. an air conditioner) of the air conditioning system. In this embodiment, for the sake of simplicity, the exchange fluid that circulates in the hydraulic circuit 12 is generally (but not necessarily) the same exchange fluid that circulates in the hydraulic circuit of the cooling device of the air conditioning system.

In particular, solenoid valves are provided, which are operated to switch the hydraulic connections of the liquid-gas heat exchanger 13 and/or of the circulation pump 19 from the hydraulic circuit 12 of the heating device 9 to the hydraulic circuit of the refrigeration system of the air-conditioning system and vice versa. In this way it is possible to reduce the number of new components necessary to implement the hydraulic circuit 12 and therefore it is possible to reduce weight, bulk and cost of the hydraulic circuit 12. Please note that the hydraulic circuit 12 of the heating device 9 is used only when the outside temperature is below zero (namely when the water in the tank 4 could freeze) and in such environmental conditions the refrigeration system of the air conditioning system is never used. Therefore, the hydraulic circuit 12 of the heating device 9 and the hydraulic circuit of the cooling device of the air conditioning system can share the components without any problem as they are never used together (at the same time).

In the embodiment shown in the attached figures, the tank 4 contains water, which is injected into the combustion chambers formed in the cylinders of the internal combustion engine 2 to increase the efficiency of the combustion and/or to increase the generated power. According to a different embodiment not shown, the tank 4 contains an aqueous urea solution (or a water-based operator liquid containing urea), which is injected along the exhaust duct 3 upstream of an SCR catalyst.

The embodiments herein described can be combined with each other without departing from the scope of protection of the present invention.

The supply system 1 described above has several advantages.

First, the heating device 9 of the supply system 1 described above allows a continuous heating of the water contained in the tank 4 (namely for the whole time of operation of the internal combustion engine 2) without any energy consumption, since the heating device 9 uses only the heat possessed by the exhaust gases. This heat is available and is "free", as it is in any case dispersed in the environment.

Moreover, the supply system 1 is designed to produce water for the tank 4 from the condensation of the exhaust gases and therefore does not require any type of external refilling, i.e. the vehicle user is never required to refuel the tank 4 from the outside. In this way, the use of the vehicle is simplified.

Thanks to the fact that the water for the tank 4 is continuously produced during the operation of the internal combustion engine 2, the tank 4 can even be very small, since it is only a small lung of a self-powered system. Consequently, the tank 4 can have a volume of a few litres (e.g. 3-5 litres) with a consequent advantageous reduction in bulk and weight. The smallness of the tank 4 also allows a rapid heating of the water contained in the tank 4, since the mass of water to be heated (or of the ice to be melted) is small.

Finally, the heating device 9 of the supply system 1 described above is immediately operative after the ignition of the internal combustion engine 2, as the exhaust gases are very hot since the first combustion, unlike, for example, the cooling liquid of the internal combustion engine 2, which can take up to 10-15 minutes to reach the temperature.

LIST OF REFERENCE NUMBERS OF THE FIGURES 1 supply system
2 internal combustion engine
3 exhaust duct
4 tank
5 pump
6 supply duct
7 injectors
8 maximum pressure valve
9 heating device
10 heat exchanger
11 heat exchanger
12 hydraulic circuit
13 heat exchanger
14 delivery duct
15 return duct
16 delivery duct
17 return duct
18 adjusting solenoid valve
19 circulation pump
20 intake duct
21 return duct
22 adjusting solenoid valve
23 condensate separator
24 supply duct
25 treatment device
26 temperature sensor
27 temperature sensor
28 control unit

The invention claimed is:

1. An internal combustion engine (2) comprising:
at least one cylinder defining a combustion chamber in which exhaust gases are generated following the combustion;
an exhaust duct (3), which is flown through by the exhaust gases leaving the combustion chamber; and
a system (1) supplying a water-based operator liquid to the combustion chamber comprising: a tank (4), which is designed to contain a certain amount of water-based operator liquid, and a heating device (9), which is coupled to the tank (4) and is designed to heat the water-based operator liquid contained in the tank (4);
wherein the heating device (9) comprises a first liquid-liquid heat exchanger (10), which is coupled to the tank (4) and is designed to heat the water-based operator liquid contained in the tank (4);
wherein the heating device (9) comprises a second gas-liquid heat exchanger (11), which is designed to be flown through by at least part of the exhaust gases flowing along the exhaust duct (3);
wherein the heating device (9) comprises a hydraulic circuit (12), which is designed to circulate an exchange fluid through the second heat exchanger (11) in order to transfer heat from the exhaust gases to the exchange fluid, and through the first heat exchanger (10) in order to transfer heat from the exchange fluid to the water-based operator liquid contained in the tank (4);

wherein the exchange fluid flowing in the hydraulic circuit (12) is completely different, independent and separate both from the water-based operator liquid contained in the tank (4) and from the exhaust gases flowing through the exhaust duct (3); and wherein the hydraulic circuit (12) is hydraulically and pneumatically isolated both from the supply system (1) and from the exhaust duct (3).

2. The internal combustion engine (2) according to claim 1, wherein the hydraulic circuit (12) comprises a first adjusting solenoid valve (18), which is designed to adjust the flow rate of the exchange fluid flowing through the first heat exchanger (10).

3. The internal combustion engine (2) according to claim 2, wherein:

the tank is provided with a first temperature sensor (26), which is designed to measure a temperature of the water-based operator liquid contained in the tank (4); and a provided control unit (28) adjusts a degree of opening of the first adjusting solenoid valve (18) based on the temperature measured by the first temperature sensor (26).

4. The internal combustion engine (2) according to claim 1, comprising:

an intake duct (20), which connects the exhaust duct (3) to an inlet of the second heat exchanger (11); and a return duct (21), which connects an outlet of the second heat exchanger (11) to the exhaust duct (3).

5. The internal combustion engine (2) according to claim 4 and comprising a second adjusting solenoid valve (22), which is designed to adjust the flow rate of the exhaust gas entering the intake duct (20) from the exhaust duct (3).

6. The internal combustion engine (2) according to claim 5, wherein:

the return duct (21) comprises a second temperature sensor (27), which is designed to measure a temperature of the exhaust gases leaving the second heat exchanger (11); and a provided control unit (28) adjusts a degree of opening of the second adjusting solenoid valve (22) based on the temperature measured by the second temperature sensor (27).

7. The internal combustion engine (2) according to claim 4, comprising:

a condensate separator (23), which is arranged along the return duct (21) and is designed to separate the condensed water present in the exhaust gases; and a supply duct (24), which connects the condensate separator (23) to the tank (4) to supply the condensed water separated by the condensate separator (23) into the tank (4).

8. The internal combustion engine (2) according to claim 7 and comprising a treatment device (25), which is arranged along the supply duct (24) and is designed to subject the condensed water to a purification treatment.

9. The internal combustion engine (2) according to claim 8, wherein the treatment device (25) comprises a mechanical filter, which stops solid particles.

10. The internal combustion engine (2) according to claim 8, wherein the treatment device (25) comprises a chemical filter holding back ions present in the condensed water.

11. The internal combustion engine (2) according to claim 8, wherein the tank (4) receives water from the supply duct (24) only.

12. The internal combustion engine (2) according to claim 1 and comprising a third liquid-gas heat exchanger (13), which is part of the hydraulic circuit (12) and is flown through by the exchange fluid in order to transfer heat from the exchange fluid to the outside.

13. The internal combustion engine (2) according to claim 12, wherein the hydraulic circuit (12) comprises:

a first delivery duct (14), which connects an outlet of the second heat exchanger (11) to an inlet of the third heat exchanger (13);

a first return duct (15), which connects an outlet of the third heat exchanger (13) to an inlet of the second heat exchanger (11);

a second delivery duct (16), which connects the first delivery duct (14) to an inlet of the first heat exchanger (10); and a second return duct (17), which connects an outlet of the first heat exchanger (10) to the first delivery duct (14).

14. The internal combustion engine (2) according to claim 1, wherein the hydraulic circuit (12) comprises a circulation pump (19).

15. Road vehicle comprising: an internal combustion engine (2) according to claim 1; and an air conditioning system provided with a cooling device having its own hydraulic circuit;

wherein the hydraulic circuit (12) of the heating device (9) comprises parts in common with the cooling device of the air conditioning system.

* * * * *